United States Patent Office 2,864,705
Patented Dec. 16, 1958

2,864,705
LIQUID SHORTENINGS

Glenn Schulman, Chicago, Ill., assignor to Glenn Laboratories, Chicago, Ill., a co-partnership No Drawing. Application August 31, 1954
Serial No. 453,427

13 Claims. (Cl. 99—118)

This invention relates particularly to the preparation of new and useful normally liquid shortenings which are highly effective for the production of baked goods of excellent volume and texture and which comprise normally liquid edible triglyceride oils containing certain improving agents, hereafter described in detail. The invention is also concerned with the production of improved flour batters and baked dough products, especially shortenings containing baked sweet cakes, as well as cookies, donuts, bread, rolls and buns. Other uses of the normally liquid shortenings of the present invention and other advantages of various aspects of the present invention are pointed out in detail below.

Normally liquid shortenings, as the term is used herein, and as it is commonly employed in the art, comprise oils of vegetable or animal origin, usually the former, typical examples of which are soya bean oil, palm kernel oil, peanut oil, corn oil, olive oil, and cottonseed oil, lard oil, sunflower seed oil, or mixtures thereof. Such liquid oils have a variety of potential advantages over normally solid or plastic shortenings, for use in baked dough products as well as for use in the production of a variety of other edible products. In the first place, the handling, measuring and storing procedures in a bakery for conventional plastic shortenings as, for instance, hydrogenated cottonseed oil and other hydrogenated oils and blends thereof, are costly, cumbersome and do not admit of the utilization of large scale automatic equipment which might otherwise be feasible in the production of baked dough products if an adequately functionally effective normally liquid shortening were available. Moreover, in the actual production of plastic shortenings, certain rigid controls are required, including careful tempering conditions, in order to obtain optimum crystal structure so that they can be used with good results in baking and allied industries. When plastic shortenings are rendered fluid and are attempted to be used in that state in the preparation of baked goods and the like, their effectiveness as shortening agents is markedly decreased.

Despite the decided convenience in ease of handling normally liquid shortenings, they have not come into any appreciable use in the bakery, or in various allied fields, because the results which are obtained through the use thereof, particularly so far as the quality and characteristics of the baked goods are concerned, have left very much to be desired. Except in the case of certain specialized types of cakes, for instance, liquid shortenings produce baked dough products with very poor texture, coarse grain and low volume, so much so that at least most cakes and various other sweet goods baked with such liquid shortenings are commercially unsalable. Cake batters made with ordinary triglyceride oil liquid shortenings are frequently oily and possess a relatively high specific gravity, for instance of the order of 1.2, whereas the same cake batters made with typical liquid shortenings of the present invention are not oily and have specific gravities of the order of 0.9. In any event, despite considerable work which has been done in this field, the regular and almost universal practice today in commercial bakeries involves the utilization of ordinary plastic shortenings with all the problems and cumbersomeness of measuring, handling and storage which such entail.

In an effort to improve liquid shortenings, as well as, for that matter, plastic shortenings, it has become the practice in more recent years to admix with such shortenings either monoglycerides, diglycerides, polyglycerides or mixtures thereof and the like, usually in proportions of the order of 4% to 8%. Although the addition of such materials to shortenings, particularly plastic shortenings, results in substantial improvement of various of their properties, particularly in relation to the preparation of cakes containing high ratios of sugar to flour, namely, so-called "Hi-Ratio" cakes, such agents have not been adequately effective in the production of normally liquid triglyceride oil shortenings because, among other things, said agents, particularly where they are in the form of palmitic or stearic acid esters which, in normal circumstances, would be their most effective form, precipitate out of the normally liquid triglyceride oil shortenings at room temperatures and, in baking, produce poor results. In an effort to utilize such materials as glycerol monostearate or glycerol distearate or mixtures thereof in conjunction with liquid shortenings, it has been proposed initially to effect the mixing of the oil with the glycerol monostearate or glycerol distearate or mixtures thereof and heating the same to form a solution at a temperature of at least about 120 degrees F. and preferably somewhat higher, the resulting solution being promptly stirred with the ingredients of the cake mix or the like. Such procedure is undesirable and cumbersome in a modern bakery or, for that matter, in the home, and, further, there are other disadvantages in such procedures.

In accordance with the present invention, normally liquid shortenings have been evolved which overcome the disadvantages of normally liquid shortenings which have heretofore been known, the shortenings of the present invention enabling the production of a wide variety of baked goods, sweet rolls, sugar cookies, icings, and the like of excellent quality. The important and significant results of the present invention are achieved through the incorporation into the usual type of liquid triglyceride oil shortening, such as soya bean oil, peanut oil, corn oil, cottonseed oil, and the like, of particular types of ester reaction products, hereafter described in detail.

The normally liquid shortening compositions of the present invention are not only easy to handle and, therefore, simplify the problems of the large as well as the small commercial baking establishments but, in addition, such shortenings have considerable versatility and can be used, in effect, as all-purpose shortenings as, for instance, not only in the baking of cakes, sweet rolls, cookies, pie dough, and the like, but also for deep fat frying, for ordinary frying, for use on salads and as salad oils or ingredients of salad oils, as ingredients of prepared cake mixes, donut mixes, in chocolate and other icings, and for various other purposes. They are especially adapted for use in the production of cakes generally and, more particularly, for the preparation of cakes, of the white or yellow layer type, in which the ratio of sugar to flour is substantially more than 1 to 1. The normally liquid shortenings of the present invention, particularly the preferred embodiments thereof, are characterized by good flavor, color, odor, high smoke point, stability, and the ability to incorporate air and hold it for the desired period in the flour or cake batter. The improving agents which are added to the normally liquid triglyceride oil are readily soluble therein at room temperature although solubility may be hastened initially by heating the oil slightly, say to 40 or 50 degrees C., do not crystallize therefrom even on long standing, are stable, and the said normally liquid shortenings can be used and advantageously are used at room temperature in admixture with flour batter ingredients or the like into which they are incorporated. At low temperatures, various of the normally liquid shortenings of the present invention tend to gel but they readily go back to a liquid stage when the shortening is brought back to room temperature without heating and without adverse affect on the solubility of the improving agents therein.

The improving agents which are utilized in accordance with the present invention comprise innocuous esters in the form of aliphatic polyhydric alcohols esterified with lactic acid, at least one but less than all of the hydroxy groups present in the radicals of said lactic acid being esterified with a fatty acid containing from 12 to 22 carbon atoms. They, or the reaction products containing them, are conveniently prepared by initially esterfying an aliphatic polyhydric alcohol with lactic acid and then reacting the resulting compound with a fatty acid containing from 12 to 22 carbon atoms or a derivative of such fatty acid which is capable of acylating the hydroxy group or groups in one or more of the radicals of the lactic acid radical. It is important to note that, in the improving agents utilized pursuant to the present invention, there is at least one fatty acid radical containing from 12 to 22 carbon atoms which is ester-linked to an hydroxy group of the lactic acid.

In the particularly preferred embodiments of the present invention, the aliphatic polyhydric alcohol, which is advantageously a normally liquid, water-soluble compound containing from 2 to 6 carbon atoms or from 2 to 6 hydroxy groups, is completely or substantially completely esterified with the lactic acid. The hydroxy group of at least one, and most advantageously not more than about one, of the lactic acid radicals of said ester is then esterified with a fatty acid containing from 12 to 22 carbon atoms, and particularly one containing from 14 to 18 carbon atoms.

Various of the improving agents whose use is encompassed by the present invention comprise aliphatic polyhydric alcohols wherein at least one or at least two of the hydroxy groups are esterified with lactic acid, and in which at least one but less than all, and in the usual case not more than half, of the hydroxy groups present in the radicals of the lactic acid are reacted under esterification conditions with a fatty acid acylating compound containing from 12 to 22 carbon atoms, and particularly a fatty acid containing from 14 to 18 carbon atoms, as pointed out above.

By varying the type of polyhydric alcohol utilized, that is, depending upon the number and arrangement of the esterifiable hydroxy groups therein, by the selection of particular fatty acids containing from 12 to 22 carbon atoms, and by modifications in the proportions of reactants employed, improving agents are obtained which have a variety of interesting and useful properties and characteristics which adapt them especially for use in accordance with the teachings of the present invention. It has been found that it is highly important, in order to obtain the desirable properties in the improving agents for use in accordance with the present invention, that, as stated above, the fatty acid radicals containing from 12 to 22 carbon atoms be ester-linked in the molecule through hydroxy groups present in the lactic acid radical or radicals of the lactic acid esters of the aliphatic polyhydric alcohols.

While various of the improving agents used pursuant to the present invention can be defined perhaps best in terms of reaction products, many of them, and particularly the active ingredients or constituents thereof can, at least in most cases, be described in terms of their apparent actual structure and illustrated by way of structural formulae.

Illustrative examples of improving agents whose use falls within the scope of the present invention are the lactic acid tri-ester of glycerin, the hydroxy group of one of the lactic acid radicals being esterified with stearic acid; the lactic acid di-ester of propylene glycol, the hydroxy group of one of the lactic acid radicals being esterified with palmitic acid; the lactic acid tetra-ester of diglycerol, the hydroxy group of one of the lactic acid radicals being esterified with lauric acid; the lactic acid hexa-ester of sorbitol, the hydroxy groups of from 1 to 2 of the lactic acid radicals being esterified with stearic acid; the lactic acid di-ester of glycerin, the hydroxy group of one of the lactic acid radicals being esterified with stearic acid; the lactic acid tri-ester of glycerin, the hydroxy group of one of the lactic acid radicals being esterified with oleic acid; and the lactic acid di-ester of propylene glycol, the hydroxy group of one of the lactic acid radicals being esterified with stearic acid.

Various of the aforementioned and other improving agents the use of which falls within the scope of the invention are shown below, by way of structural formulae:

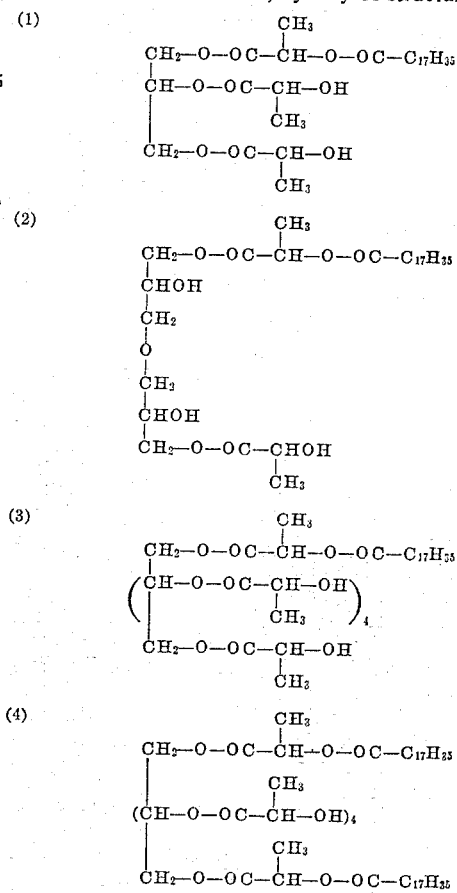

The following examples are illustrative of the production of improving agents and reaction products containing the same which are utilized pursuant to the present invention. It will be appreciated, of course, that the proportions of reacting ingredients, times of reaction, and temperatures of reaction are somewhat variable; and selections of different aliphatic polyhydric alcohols and fatty acids containing from 12 to 22 carbon atoms can readily be effected in the light of the guiding principles and teachings which are disclosed herein. The examples, therefore, are not in any way to be construed as limitative of the scope of the improving agents whose use is encompassed by the present invention.

EXAMPLE A (1) 95 grams (1 mol) of 95% glycerol and 317.6 grams (3 mols) of 85%–90% lactic acid are heated for 3 hours at 165 degrees C. under a blanket of $CO_2$ and the heating is then continued for an additional hour at the aforesaid temperature under full water pump vacuum. The resulting reaction product comprising mainly the lactic acid tri-ester of glycerin is a viscous, clear, red-yellow liquid having an acid number of about 35.

(2) To the product of part (1) of Example A, 265 grams (1 mol) of stearic acid ("Neo-Fat" 18-61, Armour Chemical Division, containing about 74% stearic acid, about 22% palmitic acid, and about 4% oleic acid) are added, the mixture is heated to 185 degrees C. and maintained at that temperature for about 8 to 10 hours, and finally heating is carried out under full water pump vacuum until the acid number falls to 10 or below. The product is then cooled to about 100 degrees C. and given three hot water washes in order to remove water-soluble components. The product is then dried at 160 degrees C. for about 15 minutes under a vacuum of about 26 inches. At room temperature, the final reaction product is waxy, is light brown or tan in color, and has relatively little flavor or odor. It is readily soluble in liquid triglyceride oils such as soya bean oil, peanut oil, corn oil, cottonseed oil, and mixtures of said oils, and forms clear solutions therein in percentages of the order of 4 to 8%. It comprises mainly the lactic acid tri-ester of glycerin, the hydroxy group of one of the lactic acid radicals being esterified with stearic acid.

EXAMPLE B

The reaction is carried out as described in Example A with the exception that 248 grams of palmitic acid are substituted for the 265 grams of stearic acid utilized in Example A. The final product is a light tan waxy solid with properties substantially similar to the product of Example A.

EXAMPLE C 210 grams of the lactic acid di-ester of propylene glycol are reacted with 260 grams of triple-pressed stearic acid at a temperature of 175 degrees C.–180 degrees C. for several hours until the acid number is below 10, cooled to about 100 degrees C., and then the product is washed several times with hot water to remove water-soluble materials. The product, on drying in a vacuum, is a waxy solid readily soluble in triglyceride oils and fats. It comprises mainly the lactic acid di-ester of propylene glycol, the hydroxy group of one of the lactic acid radicals being esterified with stearic acid.

EXAMPLE D 615 grams of the lactic acid tetra-ester of sorbitan are reacted with 280 grams of oleic acid at a temperature of 170–180 degrees C. for a period of several hours until the acid number drops to below 10. The product is worked up in the manner described in Example A. It comprises an oily liquid with good dispersing properties and contains mainly the lactic acid tetra-ester of sorbitan, the hydroxy group of one of the lactic acid radicals being esterified with oleic acid.

EXAMPLE E 1 mol of glycerin, 3 mols of 85% lactic acid, and 1 mol of a commercial stearic acid ("Neo-Fat" 18-61, supra) are mixed together and reacted while raising the temperature to 185 degrees C. and there maintaining it for about 10 hours under 5 inches of vacuum and then under full vacuum until the acid number falls below 10. The reaction product is then washed and dried as described in Example A.

It will be noted, in Example E, that all of the ingredients utilized in the reaction are mixed together and the reaction is carried out as a one-step procedure. In the light of investigations made by me, it appears that, under the conditions specified in Example E, the reaction between the glycerin and the lactic acid proceeds more rapidly than does any reaction with the stearic acid, that the hydroxy group of the lactic acid is more susceptible to esterification with the stearic acid than are the hydroxy groups of the glycerin, with the result that, in the reaction product as a whole, at least a substantial if not the major portion of the reaction mixture comprises lactic acid esters of glycerin in which the hydroxy group of one of the lactic acid radicals is esterified with stearic acid.

The aliphatic polyhydric alcohols which are utilized in the production of the improving agents or reaction products can be selected from a large available group, illustrative examples of which are glycerol; propylene glycol; polyglycerols such as diglycerol, triglycerol, tetraglycerol, and mixtures thereof; sugar alcohols such as sorbitol, mannitol, dulcitol and arabitol; inner anhydrides of sugar alcohols such as sorbitan, mannitan, sorbide and mannide; and carbohydrates such as dextrose and sucrose; and mixtures of any two or more thereof. Of particular utility are the normally liquid water-soluble aliphatic polyhydric alcohols containing from 2 to 6 carbon atoms or from 2 to 6 hydroxy groups and particularly satisfactory is glycerin.

Commercial sources of lactic acid can be used but, from a practical standpoint, they should contain at least about 80% lactic acid or be of the so-called 80% lactic acid grade. Particularly satisfactory is 85%–90% lactic acid, but one may, of course, use concentrations up to 100%. It should be understood that the particular properties of any given reaction product of the present invention will vary somewhat depending upon the type of lactic acid used. This is due to the fact that, in the esterification reaction with the aliphatic polyhydric alcohol, at the elevated esterification temperatures utilized, the lactic acid tends to chain up to form lactyllactic acid and polylactyllactic acid radicals. Furthermore, any given commercial lactic acid may, depending upon the manner and extent of its concentration, contain various lactyllactic or polylactyllactic acids and varying proportions thereof. For this reason, particularly, the improving agents utilized pursuant to the present invention are possibly best defined as reaction products as, for instance, a reaction product of 1 mol of glycerin with about 3 mols of lactic acid under elevated esterification temperatures followed by reaction thereof with about 1 mol of stearic acid or commercial stearic acid products at elevated esterification temperatures.

The fatty acids containing from 12 to 22 carbon atoms which are ester-linked to the remainder of the molecule through hydroxy groups of the lactic acid can be saturated or unsaturated illustrative examples of which are lauric acid, myristic acid, palmitic acid, stearic acid, oleic acid, linoleic acid, ricinoleic acid, linolenic acid, mixed fatty acids derived from animal or vegetable sources such as lard, coconut oil, cottonseed oil, peanut oil, soya bean oil, tallow, castor oil, fish oils, including said acids as such or partially or substantially completely hydrogenated, and the like. Of particular utility, at least in most cases, are those fatty acids or mixtures thereof which are normally solid and have from 14 to 18 carbon atoms. It will be understood, of course, that mixtures of any two or more of said acids can be utilized in the production of the improving agents. Thus, for instance, in the case of stearic acid, the usual commercial sources thereof are invariably mixtures of various fatty acids, containing predominately stearic and palmitic acids, with the stearic acid comprising at least 40% and ranging up to approximately 97% or thereabouts. Typical illustrations thereof are single pressed stearic acid, double pressed stearic acid, triple pressed stearic acid, and products sold under various trademarks such as "Hystrene S-97," "Hystrene C-80," and "Hystrene T-70" (Atlas Powder Company); "Neo-Fat" stearic acid mixtures sold under such numbers as 18 (92% stearic acid, 6% palmitic acid, 2% oleic acid), 18-59 (61% stearic acid, 29% palmitic acid, 7% oleic acid, 3% myristic acid), and 18-61 (74% stearic acid, 22% palmitic acid, 4% oleic acid) (Armour Chemical Division). In place of the free acids, acylating derivatives thereof can be utilized, such as their esters (for instance, ethyl stearate and triglycerides) and their acyl chlorides such as lauroyl chloride, palmitoyl chloride and stearoyl chloride.

The reaction between the aliphatic polyhydric alcohol and the lactic acid is carried out under esterification conditions which will usually be at elevated temperatures, ordinarily appreciably in excess of 100 degrees C. so that the reaction may proceed expeditiously, and, of course, not so high as to result in decomposition of the reactants or of the desired reaction product. In general, a temperature of about 150-175 degrees C. will be found satisfactory, with about 160-170 degrees C. most desirable in the usual case. In the subsequent reaction with the fatty acid containing from 12 to 22 carbon atoms, the conditions under which said reaction are carried out are likewise esterification conditions, with the temperature being elevated and ordinarily falling within the range of 150-200 degrees C., preferably 180-190 degrees C., depending, of course, upon the specific reactants utilized.

Particularly important, though limited, embodiments of the improving agents are encompassed by reaction products of the lactic acid tri-ester of glycerin with stearic acid, palmitic acid, or mixtures of fatty acids containing predominantly either stearic or palmitic acid, wherein the aforesaid materials are reacted in molal ratios of about 1 mol of the lactic acid tri-ester of glycerin with 1 mol of the stearic or palmitic acid or mixtures of fatty acids.

Where the esters of the aliphatic polyhydric alcohols with the lactic acid, prior to the reaction thereof with the stearic acid or the like fatty acids, contain unreacted or esterifiable hydroxy groups in the radical of the aliphatic polyhydric alcohol, it is advantageous, in order to avoid esterification of such latter hydroxy groups with the stearic acid or the like, to block said free or unesterified aliphatic polyhydric alcohol hydroxy groups prior to effecting the reaction with the stearic acid. This may be accomplished in various ways which are known in the art for blocking hydroxy groups to prevent esterification thereof. By so proceeding, the introduction of stearic acid or like fatty acids ester-linked to the hydroxy groups of the aliphatic polyhydric alcohol can be avoided so that the only or substantially the only position at which the stearic acid or like fatty acid radicals are introduced into the molecule is at the hydroxy groups of the lactic acid radical.

The proportions of the added improving agent in the liquid shortenings are variable. From about 2% to about 10%, by weight, based on the liquid shortening as a whole, will usually be found effective, with a particularly preferred range being from about 4% to about 7% or 8%. In certain cases, relatively high concentrations of the improving agent can be made in the liquid triglyceride oil, depending upon the particular improving agent selected and its solubility characteristics in the particular triglyceride oil. For instance, in the case of certain of said improving agents, concentrations of 15 to 20% can be made and these products can be regarded as shortening concentrates to be diluted with additional triglyceride oil for actual utilization of the shortening in baking or other operations. For use by the commercial baker or otherwise, the improving agents will in all cases comprise a minor proportion of the liquid triglyceride oil shortening as a whole, usually, from about 2% to about 7% or 8%.

Illustrative examples of liquid shortenings made in accordance with the present invention are set out below. It will, of course, be understood that the triglyceride oils are refined and preferably deodorized. All parts listed are by weight.

EXAMPLE F

| | |
|---|---|
| Cottonseed oil | 94 |
| Reaction product of Example A | 6 |

EXAMPLE G

| | |
|---|---|
| Peanut oil | 93 |
| Reaction product of Example B | 7 |

EXAMPLE H

| | |
|---|---|
| Corn oil | 95 |
| Reaction product of Example A | 5 |

EXAMPLE I

| | |
|---|---|
| Soya bean oil | 94 |
| Reaction product of Example C | 6 |

EXAMPLE J

| | |
|---|---|
| Peanut oil | 45 |
| Corn oil | 48 |
| Reaction product of Example D | 7 |

EXAMPLE K

| | |
|---|---|
| Corn oil | 15 |
| Soya bean oil | 80 |
| Reaction product of Example A | 5 |

EXAMPLE L

| | |
|---|---|
| Cottonseed oil | 80 |
| Peanut oil | 15 |
| Reaction product of Example A | 5 |

EXAMPLE M

| | |
|---|---|
| Peanut oil | 15 |
| Cottonseed oil | 70 |
| Corn oil | 10 |
| Reaction product of Example B | 5 |

Antioxidants or stabilizing agents of various types as, for instance, "Tenox 2" (propylene glycol solution of butylated hydroxyanisole, propyl gallate and citric acid) can be added in their usual small amounts, if desired, for instance, of the order of 0.025 to 0.075%, usually about 0.05%.

Particularly important, though limited, embodiments of the invention comprise normally liquid shortenings containing from about 4% to about 7% or 8%, by weight of the shortenings as a whole, of the lactic acid tri-ester of glycerin in which the hydroxy group of one of said lactic acid radicals is esterified with fatty acids containing predominantly from 16 to 18 carbon atoms, especially stearic or stearic and palmitic acids.

The following examples are illustrative of products made with typical embodiments of the normally liquid shortenings of the present invention. It will be understood that such examples are purely illustrative of the practice of certain aspects of the invention and are not to be construed in any way as limiting the scope thereof.

*Example I.—White cake*

| | | |
|---|---|---|
| Cake flour | ounces | 8 |
| Baker's special sugar | do | 10½ |
| Shortening of Example F | grams | 102.5 |
| Calumet baking powder | do | 14.9 |
| Milk | fluid ounces | 5½ |

Mix ½ minute at #2 speed ("Kitchen Aid" electric mixer). Scrape down and then mix 1½ minutes at #4 speed.

| | | |
|---|---|---|
| Milk | fluid ounces | 3¼ |
| Egg whites | cc | 129 |

Add and mix ½ minute at #2 speed and then 1½ minutes at #4 speed.

Scale 15 ounce batter/8 inch by 1½ inches round pan, bake 22 minutes at 365 degrees F. The finished cake has good volume and texture.

*Example II.—White cake*

| | | |
|---|---|---|
| Cake flour | ounces | 7.15 |
| Baker's special sugar | do | 10 |
| Shortening of Example F | grams | 101.2 |
| Salt | do | 7.6 |
| Calumet baking powder | do | 14.7 |

Example II.—Cake—Continued

| | | |
|---|---|---|
| Powdered skim milk | grams | 26.5 |
| Water | cc | 118 |

Same procedure as Example I.

| | | |
|---|---|---|
| Water | cc | 67 |
| Egg whites | do | 169 |

Same procedure as Example I.

Scale 14 ounce batter/8 inch by 1½ inch round pan, bake 22 minutes at 365 degrees F. The finished cake has good volume and texture.

Example III.—Yellow cake

| | | |
|---|---|---|
| Cake flour | ounces | 8 |
| Baker's special sugar | do | 10½ |
| Shortening of Example G | grams | 102.5 |
| Calumet baking powder | do | 14.9 |
| Milk | fluid ounces | 5½ |

Same procedure as Example I.

| | | |
|---|---|---|
| Milk | fluid ounces | 3¼ |
| Whole eggs | cc | 129 |

Same procedure as Example I.

Scale 15 ounce batter/8 inch by 1½ inch round pan, bake 22 minutes at 365 degrees F. The finished cake has good volume and texture.

Example IV.—Chocolate cake

| | | |
|---|---|---|
| Natural cocoa | ounces | 1½ |
| Cake flour | do | 7¾ |
| Sugar | do | 11½ |
| Shortening of Example B | grams | 109 |
| Salt | do | ¼ |
| Calumet baking powder | do | 15 |
| Milk | fluid ounces | 12 |
| Whole eggs | ounces | 4 |

The finished cake has good volume and texture.

Example V.—Chocolate icing

| | | |
|---|---|---|
| Sugar | ounces | 250 |
| Skim milk | fluid ounces | 10 |
| Cocoa | ounces | 25 |
| Chocolate liquor | do | 27 |
| Corn syrup | do | 25 |
| Salt | gram | 0.5 |
| Shortening of Example F | ounces | 40 |
| Water | fluid ounces | 22 |
| Vanilla | gram | 1 |

The dry ingredients are sifted together, the corn syrup and water are heated to boiling and then admixed with the dry ingredients in an electrical mixer, the shortening is then added, followed by the chocolate liquor and then the vanilla and the mixing is continued to produce a creamy product.

Example VI.—Prepared cake mix

| | | |
|---|---|---|
| Sugar | ounces | 16½ |
| Shortening of Example F | grams | 111 |
| Salt | do | 10.9 |
| Calumet baking powder | do | 18.3 |
| Dried egg whites | do | 17.3 |
| Cake flour | ounces | 12¾ |
| Dried skim milk | grams | 37½ |

The sugar and shortening are first blended together and the remaining dry ingredients are then admixed therewith and blended together until the final mixture is smooth and homogeneous.

An excellent cake results from admixing 24 ounces of the prepared mix with 5¾ ounces of water, mixing for ½ minute at #2 speed ("Kitchen Aid" electric mixer), scraping down, mixing 1½ minutes at #4 speed, then adding 6¼ ounces of water, mixing ½ minute at #2 speed and then 1½ minutes at #4 speed, and scaling and baking as usual.

Where the liquid shortenings of the present invention are to be used for baking purposes, especially for baking "Hi-Ratio" cakes, their utility may be further enhanced by the addition thereto of minor proportions of various supplemental agents such as those listed below. These latter supplemental agents have heretofore been used or suggested for use in fatty shortenings, flour batters and baked dough products. They include, for instance, higher molecular weight fatty acid (in which the fatty acid radicals contain from 12 to 22 carbon atoms) monoglycerides, diglycerides and polyglycerides such as monostearin, distearin, and stearic acid mono-ester of diglycerol; esters of diacetyl tartaric acid or acetyl citric acid with alcohols such as stearyl alcohol and cetyl alcohol, as well as others, described in U. S. Patent No. 2,236,516, which fall into the category of innocuous oil-soluble esters of alcohols containing an aliphatic chain of 12 to 22 carbon atoms with an acetic acid ester of an hydroxy-polycarboxylic acid containing from 4 to 6 carbon atoms. Still others of said agents are innocuous oil-soluble esters of alcohols containing an aliphatic chain of 12 to 22 carbon atoms with polycarboxylic acids containing from 4 to 6 carbon atoms as, for instance, citric acid ester reaction products wherein cetyl or stearyl alcohol in a ratio of about 2 mols of cetyl or stearyl alcohol to 1 mol of citric acid are reacted under esterification conditions; and stearyl or cetyl esters of itaconic acid, prepared, for example, by reacting about 0.62 mol of stearyl or cetyl alcohol with about 0.5 mol of itaconic acid for a period of 5 hours at a temperature of about 175 degrees C., starting out with no vacuum, then applying a 5 inch vacuum for about 3 hours, then completing the reaction under full water pump vacuum, these latter products being hard white materials soluble in vegetable oils in low percentages, of the order of about 0.3% to about 1.5%, and generally in the range of about 0.5% to about 1%, based on the weight of the triglyceride oil shortening as a whole. Another type of supplemental agent which can be utilized in the shortenings of the present invention is a higher molecular weight aliphatic alcohol such as cetyl alcohol or stearyl alcohol or mixtures thereof.

All of these supplemental agents, which are illustrative of various others falling into the same general category, are effectively utilized, particularly for baking purposes, in conjunction with the triglyceride oil shortenings of the present invention. The said supplemental agents appear to act synergistically with the improving agents heretofore described which are employed pursuant to the present invention in conjunction with the liquid shortenings. Thus, for instance, the addition to liquid shortenings, such as are shown in Examples F to M, inclusive, of from 0.5% to about 1% of such compounds as the diacetyl tartaric acid esters of stearyl or cetyl alcohols or the stearyl or cetyl esters of citric acid, or the others of the above-mentioned supplemental agents, serves to enable the whipping into the flour or cake batters or the like of even more air than can be effectively incorporated by means of the liquid shortenings of the aforesaid Examples F to M, inclusive. This is readily observed by determining the specific gravity of said flour or cake batters. Generally speaking, the synergistic effects described above, although highly desirable, are more advantageously utilized in commercial baking operations than in the household type of liquid shortening which is used as an all-purpose product because certain of said supplemental agents may have a somewhat acidic character and tend to impart a slightly sharp taste to the liquid shortenings, although this is not the case with cetyl alcohol or stearyl alcohol which additions, however, do tend to lower the smoke point of the liquid shortenings. In any event, where the liquid shortening is used in the baking of cakes or the like, any slightly sharp taste is of no moment since it is effectively masked by the other ingredients of the cake or flour batter.

While the advantages of the use of the normally liquid shortenings of the present invention are particularly significant in commercial large and small bakeries, they also manifest themselves in the household for use by the housewife. Thus, for example, cakes can readily be prepared by hand mixing methods without the utilization of electrical mixers or the like. The liquid shortenings disperse very readily in the cake or other flour batter ingredients and it is unnecessary to resort to conventional creaming processes of incorporating the sugar with plastic shortenings as is common practice in the baking of cakes today wherein plastic shortenings are utilized. Furthermore, the housewife can readily and accurately measure the liquid shortening in a measuring glass or cup thereby eliminating the problem of attempting to obtain an accurate measure of plastic shortenings. Again, the washing or cleaning of utensils and other equipment with which the liquid shortenings of the present invention come into contact in use is simple, ordinary cleansers serving readily to effect removal of the liquid shortening and ingredients containing the same from said equipment.

What is claimed as new and desired to be protected by Letters Patent of the United States is:

1. A normally liquid shortening effective for the production of baked goods of excellent volume and texture, comprising a normally liquid edible triglyceride oil containing dissolved therein from about 2% to about 10%, by weight of the shortening as a whole, of an innocuous ester in the form of an aliphatic polyhydric alcohol at least two of whose hydroxy groups are esterified with lactic acid and in which at least one but less than all of the hydroxy groups present in the radicals of said lactic acid are esterified with a fatty acid containing from 14 to 18 carbon atoms.

2. A normally liquid shortening effective for the production of baked goods of excellent volume and texture, comprising a normally liquid edible triglyceride oil containing dissolved therein from about 2% to about 20%, by weight of the shortening as a whole, of an innocuous ester in the form of an aliphatic water-soluble normally liquid polyhydric alcohol at least two of the hydroxy groups of which are esterified with lactic acid, and in which at least one but not more than about half of the hydroxy groups present in the radicals of said lactic acid are esterified with a fatty acid containing from 12 to 22 carbon atoms.

3. A normally liquid shortening effective for the production of baked goods of excellent volume and texture, comprising a normally liquid edible triglyceride oil containing dissolved therein from about 2% to about 20%, by weight of the shortening as a whole, of an innocuous ester in the form of an aliphatic water-soluble polyhydric alcohol having from 2 to 6 carbon atoms, substantially all of the hydroxy groups of which are esterified with lactic acid, and in which at least one but not more than about half of the hydroxy groups present in the radicals of said lactic acid are esterified with a fatty acid containing from 14 to 18 carbon atoms.

4. A normally liquid shortening effective for the production of baked goods of excellent volume and texture, comprising a normally liquid edible triglyceride oil containing dissolved therein from about 2% to about 20%, by weight of the shortening as a whole, of an innocuous ester in the form of an aliphatic water-soluble polyhydric alcohol containing from 2 to 6 hydroxy groups, at least the majority of said hydroxy groups of which are esterified with lactic acid, the hydroxy groups of at least one but not more than two of said lactic acid radicals being esterified with a fatty acid containing from 12 to 22 carbon atoms.

5. A normally liquid shortening effective for the production of baked goods of excellent volume and texture, comprising a normally liquid edible triglyceride oil containing dissolved therein from about 2% to about 10%, by weight of the shortening as a whole, of an innocuous reaction product of (a) 1 mol of an ester of an aliphatic polyhydric alcohol with lactic acid, in which said polyhydric alcohol contains from 2 to 6 hydroxy groups and in which substantially all of said hydroxy groups are esterified with said lactic acid, with (b) not substantially in excess of 1 mol of an acylating compound of a fatty acid containing from 12 to 22 carbon atoms.

6. A normally liquid shortening effective for the production of baked goods of excellent volume and texture, comprising a normally liquid edible triglyceride oil containing dissolved therein from about 2% to about 10%, by weight of the shortening as a whole, of an innocuous reaction product of (a) 1 mol of a lactic acid ester of an aliphatic polyhydric alcohol, which said polyhydric alcohol contains from 2 to 6 hydroxy groups and in which substantially all of said hydroxy groups are esterified with the lactic acid, with (b) not substantially in excess of 1 mol of an acylating compound of a fatty acid containing from 16 to 18 carbon atoms.

7. A normally liquid shortening effective for the production of baked goods of excellent volume and texture, comprising a normally liquid edible triglyceride oil containing dissolved therein from about 2% to about 10%, by weight of the shortening as a whole, of an innocuous reaction product of (a) 1 mol of the lactic acid tri-ester of glycerin with (b) not substantially in excess of 1 mol of a stearic acid acylating compound.

8. A normally liquid shortening effective for the production of baked goods of excellent volume and texture, comprising a normally liquid edible triglyceride oil containing dissolved therein from about 2% to about 10%, by weight of the shortening as a whole, of an innocuous lactic acid tri-ester of glycerin, one hydroxy group of one of said lactic acid radicals being esterified with a fatty acid containing from 12 to 22 carbon atoms.

9. A normally liquid shortening effective for the production of baked goods of excellent volume and texture, comprising a normally liquid edible triglyceride oil containing dissolved therein from about 2% to about 7%, by weight of the shortening as a whole, of the lactic acid tri-ester of glycerin, one hydroxy group of one of said lactic acid radicals being esterified with stearic acid.

10. A normally liquid shortening effective for the production of baked goods of excellent volume and texture, comprising a normally liquid edible triglyceride oil containing dissolved therein from about 2% to about 10%, by weight of the shortening as a whole, of an innocuous ester in the form of an aliphatic polyhydric alcohol at least two of whose hydroxy groups are esterified with lacetic acid, at least one but less than all of the hydroxy groups present in the radicals of said lactic acid being esterified with a fatty acid containing from 12 to 22 carbon atoms, and containing from about 0.3% to about 1.5%, based on the weight of the shortening as a whole, of an innocuous oil-soluble ester of an alcohol containing an aliphatic chain of 12 to 22 carbon atoms with an acetic acid ester of an hydroxy-polycarboxylic acid containing from 4 to 6 carbon atoms.

11. A normally liquid shortening effective for the production of baked goods of excellent volume and texture, comprising a normally liquid edible triglyceride oil containing dissolved therein from about 2% to about 10%, by weight of the shortening as a whole, of an innocuous ester in the form of an aliphatic polyhydric alcohol at least two of whose hydroxy groups are esterified with lactic acid, at least one but less than all of the hydroxy groups present in the radicals of said lactic acid being esterified with a fatty acid containing from 12 to 22 carbon atoms, and containing from about 0.3% to about 1.5%, based on the weight of the shortening as a whole, of an innocuous oil-soluble ester of an alcohol containing an aliphatic chain of 12 to 22 carbon atoms with a polycarboxylic acid containing from 4 to 6 carbon atoms.

12. A normally liquid shortening effective for the production of baked goods of excellent volume and texture, comprising a normally liquid edible triglyceride oil containing dissolved therein from about 2% to about 10%, by weight of the shortening as a whole, of an innocuous ester in the form of an aliphatic polyhydric alcohol at least two of whose hydroxy groups are esterified with lactic acid, at least one but less than all of the hydroxy groups present in the radicals of said lactic acid being esterified with a fatty acid containing from 12 to 22 carbon atoms, and containing from about 0.3% to about 1.5%, based on the weight of the shortening as a whole, of an innocuous oil-soluble alcohol selected from the group consisting of cetyl alcohol, stearyl alcohol and mixtures thereof.

13. A normally liquid shortening effective for the production of baked goods of excellent volume and texture, comprising a normally liquid edible triglyceride oil containing dissolved therein from about 2% to about 10%, by weight of the shortening as a whole, of an innocuous ester in the form of an aliphatic polyhydric alcohol at least two of whose hydroxy groups are esterified with lactic acid, at least one but less than all of the hydroxy groups present in the radicals of said lactic acid being esterified with a fatty acid containing from 12 to 22 carbon atoms, and containing from about 0.3% to about 1.5%, based on the weight of the shortening as a whole, of fatty acid esters selected from the group consisting of monoglycerides, diglycerides and polyglycerides in which the fatty acid radicals contain from 12 to 22 carbon atoms.

References Cited in the file of this patent

UNITED STATES PATENTS

| | | |
|---|---|---|
| 2,480,332 | Little | Aug. 30, 1949 |
| 2,509,414 | Barsky | May 30, 1950 |
| 2,614,937 | Bauer et al. | Oct. 21, 1952 |
| 2,690,971 | Iveson et al. | Oct. 5, 1954 |